Figures 1, 2:
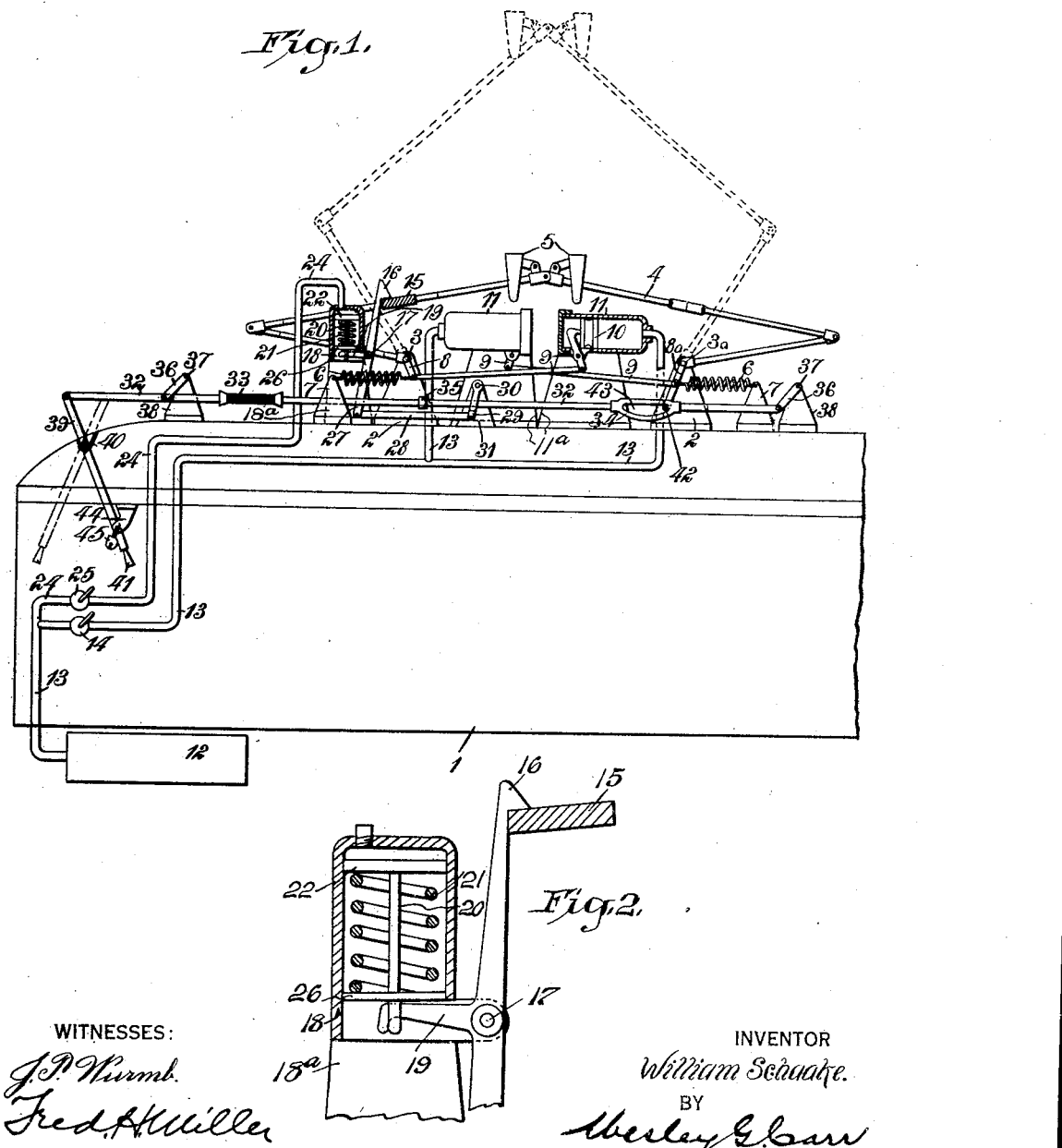

W. SCHAAKE.
PANTOGRAPH TROLLEY.
APPLICATION FILED SEPT. 16, 1918.

1,400,101.

Patented Dec. 13, 1921.

WITNESSES:
J. P. Wurmb.
Fred H. Miller

INVENTOR
William Schaake.
BY
Wesley G. Carr
ATTORNEY

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

PANTOGRAPH-TROLLEY.

1,400,101.  Specification of Letters Patent.  Patented Dec. 13, 1921.

Application filed September 16, 1918. Serial No. 254,185.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Pantograph-Trolleys, of which the following is a specification.

My invention relates to trolleys and particularly to operating means for pantograph trolleys.

One object of my invention is to provide a device of the above indicated character that shall normally be controlled by pneumatic means and operable by hand-manipulated means to insure the actuation thereof when the air supply therefor is inadequate.

Another object of my invention is to provide means whereby a pantograph trolley that is normally pneumatically controlled shall be operable by hand manipulation from the cab of a locomotive and lockable to prevent the actuation of the trolley by either means.

Heretofore, in spring-extended pneumatically-retracted pantograph trolleys, employing pneumatically controlled latching devices to restrain them in retracted position, some inconvenience has been experienced in operating the same at times of either a complete or a partial failure of air supply.

In practising my invention, I provide means, conveniently operable from the cab of a locomotive, whereby a normally pneumatically-controlled pantograph trolley may be manually actuated at any time, irrespective of its air supply, and that may be locked to prevent the operation thereof by either means.

Figure 1 of the accompanying drawing is a side view, partially in elevation and partially in section, of a pantograph trolley embodying my invention and indicating a locomotive or other vehicle on which the trolley may be mounted and Fig. 2 is a detail view of a portion of the locking mechanism for the trolley.

A locomotive 1 pivotally supports, by means of brackets 2 and pins or rods 3 and 3ª, an extensible pantograph frame 4, of usual construction, that supports contact members 5 for engagement with a trolley conductor (not shown).

The frame 4 may be biased toward, and moved to, its extended position (indicated by dotted lines) by springs 6 respectively extending between stationary brackets 7 disposed on the locomotive 1 and arms 8 and 8ª rigidly related to the frame 4, and be retracted to the position indicated by full lines by coöperating links 9 and pistons 10 disposed in cylinders 11 supported on brackets 11ª and connected to an air reservoir 12 through tubes 13 having an actuating valve 14, or by manually operated means to be hereinafter described.

A member 15, attached to the upper part of the frame 4, engages, in a retracted position of the frame, indicated by full lines, a latching pawl 16 pivoted on a pin 17 supported by a cylinder 18 that may be suitably supported on the locomotive. As shown more clearly in Fig. 2, an arm 19 of the pawl 16 operatively connects the latter, through a rod 20 to a piston 22 in the cylinder 18 that is supported on the locomotive 1 by a bracket 18ª and is adapted to receive air from the reservoir 12 through a pipe 24 having a valve 25. A spring 21 is located between a stationary portion 26 of the cylinder 18 and the piston 22 and biases the pawl 16 toward its latching position with respect to the member 15, the unlatching operation being effected by the admission of air to the cylinder 18 at the upper side of the piston 22.

The pawl 16, in addition to its portion for engagement with the member 15 and its arm 19, may be further provided, for a purpose to be hereinafter described, with a depending rigidly related arm 27 pivoted to one end of a link 28 that is pivotally connected, at its other end, to a rocker arm or link 29 pivotally depending from a pin 30 in a stationary bracket 31 on the locomotive 1.

A longitudinally movable rod 32, having an insulating section 33 and a slotted member 34, also forming a section thereof, and a collar or enlarged portion 35 may be pivotally suspended, at suitable points along its length, on links 36 loosely depending from pins 37 in stationary brackets 38 supported on the locomotive 1.

An arm 39, intermediately pivoted on a pin 40 and extending into the cab of the locomotive 1, may be pivotally secured, at its upper end, to one end of the rod 32 and have an operating handle 41 at its lower end. The arm 8ª projects beyond its point of connection to its coöperating link 9 and supports a pin 42 laterally projecting into the slot 43 of the member 34. A stationary bracket 44 or other means may be suitably disposed in the cab of the locomotive to coöperate with the arm 39 and a padlock or other device 45 to hold the frame 3 in a retracted position to prevent engagement of the members 5 with a trolley conductor. The manually-operated devices just described may be moved to their full-line positions after the trolley has been lowered by means of compressed air, or they may actually serve to retract the trolley in case of entire or partial failure of air pressure in the cylinder 11.

With the arm 39 thus locked and the other coöperating members positioned as indicated by the full lines, the frame 4 may not be extended by actuation of the valve 25 to pneumatically release the pawl 16, by reason of the fact that the pin 42 is held by the member 34 to prevent counter-clockwise rotation of the arm $8^a$ about the pin $3^a$.

When the arm 39 is released from the bracket 44 and moved to the position indicated by broken lines, the rod 32 moves to the right, swinging on the links 36, positions the collar 35 adjacent to the rocker arm 29 and the pin 42 at the end of the slot that is opposite the end it had previously occupied. In this position of the arm 39 and the rod 32, the frame 4 may be operated either manually or by pneumatic means. To manually release the frame 4, the arm 39 is moved slightly farther, in the clockwise direction, about its pivot, by which movement the collar 35 engages and moves the rocker arm 29, which, through the link 28 and the arm 27, disengages the pawl 16 from the member 15. During this operation, the pin 42 moves freely in the slot 43 of the member 34 that has been moved to a position in which its middle point is located substantially in the same vertical plane as the axis of the pin $8^a$, the lower wall of the slot conforming to the arc of a circle having the pin $8^a$ as its center. The frame may, therefore, be pneumatically retracted and be permitted to assume its expanded position without interference from the manual operating means, and, on the other hand, if the pneumatic means becomes ineffective, the manually actuated devices may be readily utilized in lieu thereof.

While I have shown and described a particular form of my invention, changes may be effected therein without departing from the spirit and scope thereof, as set forth in the appended claims.

I claim as my invention:

1. A trolley comprising a pantograph frame biased to its extended position, means for retracting the frame, latching means for holding the frame in a retracted position, means for actuating said latching means to release said frame, and additional means, having a plurality of positions, for releasing said latching means and moving said frame and for preventing the movement of said frame in one of its positions.

2. A trolley comprising a pantograph frame, means for normally yieldingly maintaining the frame in advanced position, pneumatically actuated means for moving the frame to retracted position, pneumatically controlled latching means for holding the frame in retracted position, a second means independent of the pneumatically actuated retracting means for retracting the frame, and means independent of the latching means for coöperating with the said second means for locking the pantograph in retracted position.

3. A trolley comprising a pantograph frame adapted to be advanced and retracted, an operating mechanism therefor consisting of means for normally maintaining the frame in one position, means for moving the frame to another position, means for locking the frame in one of said positions, a second operating mechanism independent of said first-named mechanism for moving the frame, and means associated with the second-named operating mechanism for locking the pantograph frame in one of its positions.

4. A trolley comprising a pantograph frame adapted to be advanced and retracted, an operating mechanism therefor consisting of means for normally maintaining the frame in one position, means for moving the frame to another position, means for locking the frame in one of said positions, and a second operating mechanism independent of said first-named mechanism for releasing the said locking means and for moving the frame to one of its positions.

5. A trolley comprising a pantograph frame adapted to be advanced and retracted, an operating mechanism therefor consisting of means for normally maintaining the frame in one position, means for moving the frame to another position, means for locking the frame in one of said positions, a second operating mechanism independent of said first-named mechanism for releasing the said locking means and for moving the frame to one of its positions, and means associated with the second operating mechanism for locking the pantograph in one of its positions.

In testimony whereof, I have hereunto subscribed my name this 27th day of August, 1918.

WILLIAM SCHAAKE.